(12) United States Patent
Sanchez Yanguela et al.

(10) Patent No.: US 9,735,866 B2
(45) Date of Patent: Aug. 15, 2017

(54) METHOD, SYSTEM AND DEVICE FOR THE SUPERVISION OF OPTICAL FIBRES

(71) Applicant: Telefonica, S.A., Madrid (ES)

(72) Inventors: Manuel Sanchez Yanguela, Madrid (ES); Rafael Canto Palancar, Madrid (ES)

(73) Assignee: Telefonica, S.A., Madrid (ES)

( * ) Notice: Subject to any disclaimer, the term of this patent is extended or adjusted under 35 U.S.C. 154(b) by 0 days.

(21) Appl. No.: 15/029,370

(22) PCT Filed: Oct. 18, 2013

(86) PCT No.: PCT/ES2013/070723
§ 371 (c)(1),
(2) Date: Apr. 14, 2016

(87) PCT Pub. No.: WO2015/055864
PCT Pub. Date: Apr. 23, 2015

(65) Prior Publication Data
US 2016/0241330 A1   Aug. 18, 2016

(51) Int. Cl.
| | |
|---|---|
| *H04B 10/00* | (2013.01) |
| *H04B 10/071* | (2013.01) |
| *H04B 10/077* | (2013.01) |
| *H04J 14/02* | (2006.01) |

(52) U.S. Cl.
CPC ....... *H04B 10/071* (2013.01); *H04B 10/0771* (2013.01); *H04J 14/0242* (2013.01); *H04J 14/0282* (2013.01)

(58) Field of Classification Search
CPC ............... H04B 10/071; H04B 10/0771; H04J 14/0242; H04J 14/0282

USPC ....................................................... 398/21, 25
See application file for complete search history.

(56) References Cited

U.S. PATENT DOCUMENTS

| | | | | |
|---|---|---|---|---|
| 5,327,514 A * | 7/1994 | Dujon | ...................... | G02B 6/06 348/E5.028 |
| 5,530,666 A * | 6/1996 | Kashyap | .................. | G02B 6/28 359/34 |
| 5,557,693 A * | 9/1996 | Stevens | .................... | G02B 6/06 385/115 |
| 5,570,440 A * | 10/1996 | Mizrahi | ............. | G02B 6/02085 385/14 |
| 5,936,719 A * | 8/1999 | Johnson | ............. | G01M 11/3136 356/73.1 |
| 6,009,220 A * | 12/1999 | Chan | .................... | H04B 10/071 385/24 |
| 6,212,310 B1 * | 4/2001 | Waarts | ............... | G02B 6/29319 372/43.01 |

(Continued)

FOREIGN PATENT DOCUMENTS

| | | |
|---|---|---|
| ES | 2417954 A2 | 8/2013 |
| WO | 96/310222 A1 | 10/1996 |
| WO | 2013/017302 A1 | 2/2013 |

*Primary Examiner* — Agustin Bello
(74) *Attorney, Agent, or Firm* — Hayes Soloway PC

(57) ABSTRACT

The present invention describes a method, system and device for supervising a set of optical fibers of an Optical Network (detecting and locating the failures in deployed optical fibers) which solve some of the problems found in prior art techniques The embodiments of the present invention suggest an innovative approach, which allows to accurately and unambiguously detect and locate failures even in complex point to multipoint optical fiber networks.

15 Claims, 10 Drawing Sheets

(56) References Cited

U.S. PATENT DOCUMENTS

| | | | |
|---|---|---|---|
| 6,269,204 B1 | 7/2001 | Ishikawa | |
| 6,275,632 B1* | 8/2001 | Waarts | G02B 6/29319 372/43.01 |
| 6,298,187 B1* | 10/2001 | Waarts | G02B 6/29319 372/6 |
| 6,396,575 B1* | 5/2002 | Holland | G01M 11/3181 356/73.1 |
| 6,411,323 B1* | 6/2002 | Waarts | G02B 6/29319 347/241 |
| 6,512,615 B2* | 1/2003 | Wu | G02B 6/272 398/49 |
| 6,524,237 B1* | 2/2003 | McGowan | G02B 6/04 348/E7.087 |
| 6,587,189 B1* | 7/2003 | Roberts | G02B 6/04 348/E5.028 |
| 6,928,243 B2* | 8/2005 | Youn | H04B 10/077 398/33 |
| 7,173,690 B2* | 2/2007 | Haran | G01N 21/21 356/73.1 |
| 7,206,478 B2* | 4/2007 | Yeh | G02B 6/29314 359/341.1 |
| 7,502,391 B2* | 3/2009 | Varnham | H01S 3/06754 372/26 |
| 7,620,319 B2* | 11/2009 | Krimmel | H04B 10/071 398/13 |
| 7,800,744 B2* | 9/2010 | Lai | H04B 10/071 356/73.1 |
| 8,000,601 B2* | 8/2011 | Schofield | H04B 10/071 398/40 |
| 8,285,138 B2* | 10/2012 | Lewin | G06E 3/00 398/16 |
| 8,290,363 B2* | 10/2012 | Nakajima | G01M 11/3136 398/13 |
| 8,326,151 B2* | 12/2012 | Lee | H04B 10/564 398/68 |
| 8,390,797 B2* | 3/2013 | Woodward | G01M 11/3109 356/73.1 |
| 8,406,620 B2* | 3/2013 | Khermosh | H04B 10/071 398/13 |
| 8,482,725 B2* | 7/2013 | Perron | G01M 11/3118 356/73.1 |
| 8,594,496 B2* | 11/2013 | Effenberger | G01M 11/3127 250/227.15 |
| 8,606,117 B1* | 12/2013 | Turner | H04B 10/071 298/13 |
| 8,655,167 B1* | 2/2014 | Lam | H04B 10/071 398/16 |
| 8,724,102 B2* | 5/2014 | Urban | G01M 11/3136 356/73.1 |
| 8,736,826 B2* | 5/2014 | Lovely | G01D 5/353 356/73.1 |
| 8,750,703 B2* | 6/2014 | Effenberger | G01M 11/3127 250/227.15 |
| 8,805,184 B2* | 8/2014 | Melamed | H04B 10/0771 398/13 |
| 9,103,746 B2* | 8/2015 | Kaufhold | G01M 11/3136 |
| 9,304,017 B2* | 4/2016 | Handerek | G01M 11/3127 |
| 9,574,970 B2* | 2/2017 | Handerek | G01M 11/3127 |
| 2004/0081463 A1* | 4/2004 | Kim | H04J 14/005 398/78 |
| 2005/0084266 A1* | 4/2005 | Pohjola | H04J 14/005 398/77 |
| 2006/0153491 A1* | 7/2006 | Murphy | H04B 10/071 385/13 |
| 2008/0068606 A1* | 3/2008 | Rogers | G01L 11/025 356/365 |
| 2008/0246582 A1* | 10/2008 | Teichmann | A61B 18/22 340/5.1 |
| 2009/0263123 A1 | 10/2009 | Zhu et al. | |
| 2009/0268197 A1* | 10/2009 | Perron | G01M 11/3136 356/73.1 |
| 2009/0314925 A1* | 12/2009 | Van Vorhis | A61B 19/5244 250/203.2 |
| 2011/0090486 A1* | 4/2011 | Udd | G01B 11/18 356/73.1 |
| 2011/0311220 A1* | 12/2011 | Nakajima | H04B 10/071 398/20 |
| 2012/0002959 A1* | 1/2012 | Melamed | H04B 10/0771 398/10 |
| 2012/0045205 A1* | 2/2012 | Perron | H04B 10/0795 398/48 |
| 2012/0076453 A1* | 3/2012 | Murphy | H04B 10/071 385/13 |
| 2013/0051791 A1* | 2/2013 | Zhao | H04B 10/0773 398/17 |
| 2014/0212130 A1* | 7/2014 | Urban | G01M 11/3127 398/13 |
| 2014/0268111 A1* | 9/2014 | Couch | G01M 11/31 356/73.1 |
| 2016/0153864 A1* | 6/2016 | Couch | G01M 11/3172 356/73.1 |
| 2016/0241330 A1* | 8/2016 | Sanchez Yanguela | H04B 10/071 |
| 2016/0308605 A1* | 10/2016 | Kang | H04B 10/071 |

\* cited by examiner

METHOD, SYSTEM AND DEVICE FOR THE SUPERVISION OF OPTICAL FIBRES

TECHNICAL FIELD OF THE INVENTION

Present invention generally relates to optical fibre networks and more specifically to the operation and maintenance of optical fibre networks presenting a method, system and a device for detecting and locating faults in optical fibre networks.

BACKGROUND OF THE INVENTION

Telecommunication operators are now deploying new optical transport and access networks capable of improving their services portfolio and satisfying high-demanding customer requirements. For transport, the operators have deployed high capacity transmission infrastructure, for example using optical fibre cables with multiple fibres per cable.

Point to point transport links permit the connection between the interfaces of two different equipments located at different Central Offices by means of one or two optical fibres 6. The usage of one or two optical fibres will depend on the transmission technology used: only one fibre will be used if different wavelengths are used for each direction (e.g. $\lambda_E$ for communication from the first to the second Central Office and $\lambda_W$ for communication from the second to the first Central Office), using Wavelength Division Multiplexing (WDM) techniques, or two fibres when the same wavelength ($\lambda_C$) is used for the transmission in both directions.

FIG. 1 shows the typical cross section of an optical fibre cable 1000 used by telecoms operators. The cable 1000 is protected by a coat 1004. If the cable needs an additional protection it has a shield 1005. Inside the cable 1000, the optical fibres 6, with an external jacket 1001 are grouped inside microtubes 1002, and there is an aramid ("aromatic polyamide") core 1003 which provides traction resistance and strength to the whole cable.

Each fibre strand 6 is identified by the colour code used in the jacket 1001. This colour code allows identifying univocally each fibre 6. This colour code may be defined in a Telecommunications Standard as the TIA (Telecommunications Industry Association) Standard EIA-598-A where 12 different colours are defined. When there are multiple microtubes 1002, each one is also identified by a different colour.

For access networks, most operators are deploying point to multipoint passive optical access networks (they are called passive networks because they do not use any active device that must be remotely fed), also known as PON (Passive Optical Networks). These PON networks used the same cables described in FIG. 1. International Telecommunications Union has standardized these optical access networks over fiber with a point to multipoint topology in different standards, for example, GPON (Gigabit capable Passive Optical Networks, ITU-T G.984.1), XG-GPON (10-Gigabit capable Passive Optical Networks, ITU-T G.987.1) and EPON (Ethernet Passive Optical Networks, ITU-T 802.3ah-2004 Part 3) and they are the most widespread solutions used to provide broadband access over fibre.

In the case of optical access, previously mentioned solutions have been designed to provide broadband access over a point to multipoint passive fibre infrastructure and have been chosen by operators because they provide high access rates without the investment required by point to point fibre access networks. FIG. 2 shows the topology of PON access networks used in these systems.

As it is shown in FIG. 2, MxN Customer Premises 2 are connected to a unique Optical Line Termination (OLT) 4 located in an OLT chassis 3 at the carrier's Central Office, CO, 1. The transmission medium, the fibre 6, connects the OLT 4 with MxN Optical Network Units (ONUs) 5 located at Customer Premises 2. To do so, fibre access infrastructure has a point to multipoint topology, using (passive) optical power splitters 7a (1:M) and 7b (1:N) to split the optical signal from the OLT 4 into the different ONUs 5. Optical splitting can be done at only one point, but for deployment reasons, optical power splitting is typically being done in two levels. For the first level is used only one power splitter 7a, with one input and M outputs and for the second splitting level, there are M optical power splitters 7b, each of them with one input and N outputs.

These new optical transmission and access infrastructures entail new challenges. As a relatively recent technology, fiber optical networks are still being deployed almost at the same time as their development is progressing. This leads to a continuous adaptation for managing bigger networks each time and so, the reliability of the optical fiber networks becomes a main issue.

As it is unavoidable that some faults appear, the main issue turns to the quick detection, location and repair of the fault to make as short as possible the time of service interruption, but supervising faults in a fibre infrastructure may lead to very high operational cost, especially behind branching elements, such as power splitters in the outside plant (OSP).

In case of optical transport, based on point to point optical links, there are solutions based on reflectometry techniques. These techniques permit the detection of failures (breaks, splices, bad contacts, bends . . . ) by sending optical pulses and measuring the delay of the received echo. This technique works, and it is extensively used by Telecommunications operators. But an optical cable used for high capacity transport links comprise several fibres. If one of those fibres fails, it is necessary to identify which one does, and that means to repeat the reflectometry test for each fibre in the optical cable. Once the failure has been identified, Telecommunications technicians have to register the colour code of the damaged fibre. It is a tedious process and there is no way to do it automatically.

In case of optical access, supervision problem in PON networks is even more complex. Traditional supervision methods based on classic reflectometry, which are suitable for point to point topologies, do not work properly in these type of networks due to their point to multipoint topology. Reflectometric methods consist of the emission of variable width pulses. The impairments (breaks, splices, bad contacts, . . . ) distributed along the transmission medium (copper, coaxial or fibre) create echoes, which are analysed at the emission point. The delay between the pulse and its echo permits to estimate the impairment (failure) location while the analysis of the echo waveform and spectrum helps to determine the type of impairment which has caused the echo. For this analysis, the system has a time domain/frequency domain analyzer.

These techniques are also applied in PON access networks, as it is shown in FIG. 3. There is an optical signal generator 300a which generates pulses at wavelength $\lambda_O$ (said signal generator has a transmitter 310a and a time domain/frequency domain analyzer receiver 311a). These optical pulses are injected into the PON network using a circulator 320 and an Automated Optical Distribution Frame

8. The Automated Distribution Frame 8 permits that the same reflectometry based supervision system can be shared between the multiple PON trees deployed from the same Central Office 1. The received echoes are sent by the optical circulator 320 to the analyser 311*a*.

But due to their point to multipoint topology, where the optical signal at wavelength $\lambda_0$ emitted by the light source 300*a* reaches all the ONUs 5, it is not possible to univocally identify the point where the impairment is located. The received echoes generated by impairments in different PON branches can overlap if different impairments located at different branches are at the same distance from the CO 1. So, it is possible to determine the distance from the central office where the impairment is, but it is not possible to identify the branch of the PON network where this impairment is located.

Hence, with the existing supervision systems is not possible to unambiguously determine an impairment position, the supervision system does not help to reduce optical access network Operating Expenses.

Some solutions have been developed in the prior art for impairment location disambiguation:

Patent Application WO2012126738 discloses the usage of narrowband optical filters centred at different wavelengths for each customer. It is a complex approach because the operator needs to use a lot of number of narrowband optical filters, either Fibre Bragg Grating (FBG) or Thin Film Filters (TFF), each one centred at different wavelength, to identify each branch. So, as many different filters as branches are in the point to multipoint optical access network which imply a huge cost.

In other cases, solution consists of polarization makers situated in each branch of the point to multipoint tree, each one producing a unique Polarization Dependent Loss (PDL). So echoes generated by each marker will be different from the remainder allowing a univocal branch identification (as disclosed in Patent U.S. Pat. No. 6,396,575). This solution entails a detail analysis and inventory of the PDL introduced by each polarization markers used in the optical access network.

Aforementioned solutions are complex because they entail a tight control by means of inventory of either the narrowband filters or the polarization markers assigned to each branch of each PON network. This tight inventory control entails the risk of monitoring and maintenance errors.

Hence there is a need for an efficient point to multipoint optic fibre supervision system which solve the drawback presented by the prior art systems.

SUMMARY OF THE INVENTION

The present invention describes a method, system and a device for detection and location of failures in deployed optical fibres. In order to do that, it provides a mechanism for the identification of deployed optical fibres, labelling each fibre with a code implemented by means of a set of polarization selective suppressed band optical filters, each one tuned at a different central wavelength. This coding scheme which can be mapped into a code (e.g. a binary code), different per each fibre, permits the identification of each fibre and allows the automation of optical plant supervision by means of reflectometry.

The problems found in prior art techniques are generally solved or circumvented, and technical advantages are generally achieved, by the disclosed embodiments.

In a first aspect of the invention, a method is presented for supervising a set of optical fibres of an Optical Network, the method being characterized by comprising the steps of:

a) assigning to each fibre of the set of fibres an unique binary code of L bits, where said binary code is defined by a set of L polarization sensitive optical filters located in each fibre, each filter being tuned at a different wavelength of a set of L wavelengths $\{\lambda_1, \lambda_2 \ldots, \lambda_L\}$, being L a design parameter, and being sensitive to one of two orthogonal polarization components, being the binary code assigned to each fibre different from the binary code assigned to the rest of fibres of the set of fibres b) injecting a different light signal at an input of said Optical Network for each fibre to be supervised, where said light signal is the result of mapping a binary sequence into polarized light pulses, each polarized light pulse being centred at a certain wavelength of the set of L wavelengths and having a polarization which will depend on the binary code assigned to each fibre to be supervised c) for each injected signal, receiving the light signal reflected from the set of fibres by an optical receiver sensitive to wavelength and polarization, and d) determining if there has been a failure in the set of fibres and the fibre where the failure is located by analysing the received light signals.

The optical network may be a Passive Optical Network and the set of wavelengths may be comprised in the U-band (1625 nm-1675 nm).

In an embodiment, each bit of the binary code is defined by the polarization component to which each filter of the set is sensitive. Each fibre is assigned a binary code which is obtained by assigning to each bit i, $1 \leq i \leq L$ a first value if the filter of the set of filters of the fibre centred at wavelength $\lambda_i$ is sensitive to a first polarization component and a second value if it is sensitive to a second polarization component, being the set of filters located in each fibre such that the binary code obtained for each fibre is different from the binary code obtained for the rest of the fibres of the set of fibres.

The filters of the set of filters are co-located or, in other words, they are at the same distance from the input of the Optical network (where the reflectometer with the emitter and the receiver is located).

In an embodiment, the step of determining if there has been a failure in the set of fibres and the fibre where the failure is located comprises comparing the received light signal for each fibre with an expected reflected signal for each fibre. Said expected reflected signal for each fibre will be calculated according to the binary sequence used in the injected signal for said fibre and the binary sequence used.

In an embodiment, the determining step comprises: translating the received signal received into a binary sequence (for example, by assigning to each bit i, $1 \leq i \leq L$, a first value if the received signal at wavelength $\lambda_i$ has a first polarization component and a second value if the reflected signal at wavelength $\lambda_i$ has a second polarization component) according to the wavelengths and polarizations used in the injected signal and correlating said binary sequence with the binary sequence used in the injected signal.

In an embodiment, $L = \lceil \log_2 S \rceil$, being S the number of optical fibres being supervised (in an embodiment, all the fibres of the network will be supervised so S will be number of fibres of the Optical Network) and where $\lceil\ \rceil$ represents the upper integer limit closer to the S binary logarithm.

In an alternative embodiment, L>[log$_2$ S], being S the number of optical fibres being supervised and where ⌈ ⌉ represents the upper integer limit closer to the S binary logarithm.

The filters may be narrowband suppression optical filters sensitive to polarization such us Tilted Fibre Bragg Grating filters.

In an embodiment, the binary sequence is a sequence with high autocorrelation and low-cross correlation. Said binary sequence can be a PRBS sequence.

In an embodiment, the injected polarized light signal is the result of mapping each chip of said binary sequence into a pulse with a wavelength of the set of wavelengths and with the right polarization component according to the set of filters of the fibre which is going to be supervised and the value of the chip. A different binary sequence may be used for each fibre to be supervised.

Another aspect of the invention refers to a system for supervising a set of optical fibres of an Optical Network, the system being characterized by comprising:

sets of L filters located one set in each optical fibre of the set of fibres, each filter of each set being tuned at a different wavelength of the set of L wavelengths $\{\lambda_1, \lambda_2 \ldots, \lambda_L\}$, being L a design parameter and being sensitive to one of the two orthogonal polarization components and where an unique binary code of L bits is assigned to each fibre, where each bit of the binary code is defined by the polarization component to which each filter of the set is sensitive, being the sequence of pairs formed by the wavelength to which each filter of a set is tuned and the polarization component to which each filter of a set is sensitive in each set of filters different from the sequence in the rest of set of filters of the rest of the fibres so the binary code assigned to each fibre is different from the binary code assigned to the rest of fibres of the set of fibres a light emitting source configured for injecting a different polarized light signal for each of the fibres to be supervised at an input of said Optical Network, where said light signal is the result of mapping a binary sequence into polarized light pulses, each polarized light pulse being centred at a certain wavelength of the set of L wavelengths and having a polarization which will depend on the binary code assigned to each fibre an optical receiver sensitive to wavelength and polarizations configured to receive the light signal reflected for each injected signal and to determine if there has been a failure in the set of fibres and the fibre where the failure is located by analysing the reflected signal.

The light emitting source and the optical receiver may be collocated at the input of said Optical Network Another aspect of the invention refers to a device for supervising a set of optical fibres of an Optical Network where each fibre of the set of fibres has a set of L filters where L is a design parameter, each filter tuned at a different wavelength of the set of L wavelengths and being sensitive to one of the two orthogonal polarization components, and where an unique binary code of L bits is assigned to each fibre, where each bit of the binary code is defined by the polarization component to which each filter of the set is sensitive, being the binary code assigned to each fibre is different from the binary code assigned to the rest of fibres of the set of fibres, the device being characterized by comprising:

a light emitting source configured for injecting a different polarized light signal for each of the fibres to be supervised at an input of said Optical Network, where said light signal is the result of mapping a binary sequence into polarized light pulses, each polarized light pulse being centred at a certain wavelength of the set of L wavelengths and having a polarization which will depend on the binary code assigned to each fibre an optical receiver sensitive to wavelength and polarizations configured to receive the light signal reflected for each injected signal and to determine if there has been a failure in the set of fibres and the fibre where the failure is located by analysing the reflected signal.

According to another aspect of the invention, a computer program product is provided, comprising computer-executable instructions for performing any of the method previously disclosed, when the program is run on a computer, a digital signal processor, a field-programmable gate array, an application-specific integrated circuit, a micro-processor, a micro-controller, or any other form of programmable hardware and a digital data storage medium is also provided encoding a machine-executable program of instructions to perform any of the methods disclosed.

Consequently, according to the invention, a method, system, devices and computer program according to the independent claims are provided. Favourable embodiments are defined in the dependent claims.

These and other aspects of the invention will be apparent from and elucidated with reference to the embodiments described hereinafter.

DESCRIPTION OF THE DRAWINGS

To complete the description that is being made and with the object of assisting in a better understanding of the characteristics of the invention, in accordance with a preferred example of practical embodiment thereof, accompanying said description as an integral part thereof, is a set of drawings wherein, by way of illustration and not restrictively, the following has been represented.

DETAILED DESCRIPTION OF THE INVENTION

Figure 1:
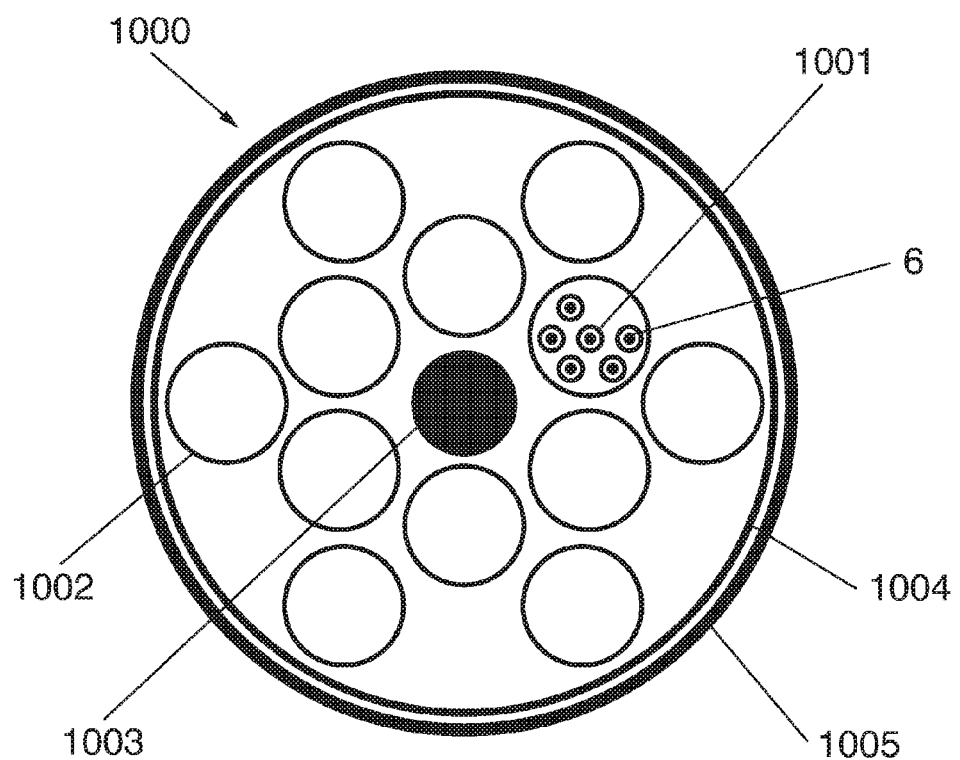
FIG. 1 shows an schematic cross section view of an optical fibre cable.

The present invention may be embodied in other specific devices, system and/or methods. The described embodiments are to be considered in all respects as only illustrative and not restrictive. In particular, the scope of the invention is indicated by the appended claims rather than by the description and figures herein. All changes that come within the meaning and range of equivalency of the claims are to be embraced within their scope.

The present invention deals with failure detection and location in Optical Fibre networks. The presented embodiments are going to refer to this type of networks but the embodiments are applicable as well to other types of networks.

The following embodiments solves some of the problems found in the prior art content delivery techniques.

The embodiments of the present invention suggest an innovative approach, which allows to accurately detect and locate failures even in complex point to multipoint optical fibre networks.

The process is based on marking each fibre with a binary code implemented by means of a set of co-located optical narrowband suppression filters, each one of them centred at a different wavelength. These codes defined by these filters may be mapped unambiguously to the colour codes used to identify each fibre of an optical fibre cable.

In order to transform these sets of optical narrowband suppression filters into a binary code, three requirements must be met:

1. The reflection introduced by each optical narrowband suppression filter has to be modulated, so it can be logically mapped into a code of values belonging for example to a binary set of values $\{-1,+1\}$. It could not be done using Fibre Bragg Grating (FBG) filters. These FBG filters can be tuned to the desire wavelength, and the optical receiver of the reflectometer will not receive echoes from those fibres where their code do not include an optical narrowband suppression filters centred at the wavelength emitted by the source. But for a binary code implementation it is necessary to obtain for each wavelength an echo, a different kind of echo at the same wavelength depending on the binary code assigned. And a conventional Fibre Bragg Grating does not behave in this way.

The different response at the same wavelength can be achieved using Tilted Fibre Bragg Grating (TFBG) filters. A Tilted Fibre Bragg Grating filter is Fibre Bragg Grating filter which is sensitive to light polarization, and it reflects only one of the polarization components of the received signal at the centre wavelength, and permits the other component to traverse it. Of course if the light pulse received is not centred at the centre wavelength of the filter, both light components are not affected by the filter (so they can traverse it) And the light which travels through the optical fibre core has two different polarization components (p and s), which are mutually orthogonal (for example vertical and horizontal), and simultaneously, both of them are mutually orthogonal to light propagation direction. Depending on the position of Tilted Fibre Bragg Gratings planes in relation to the longitudinal fibre's axis and in relation to a plane orthogonal to that axis, p or s components will be reflected.

Figure 4:
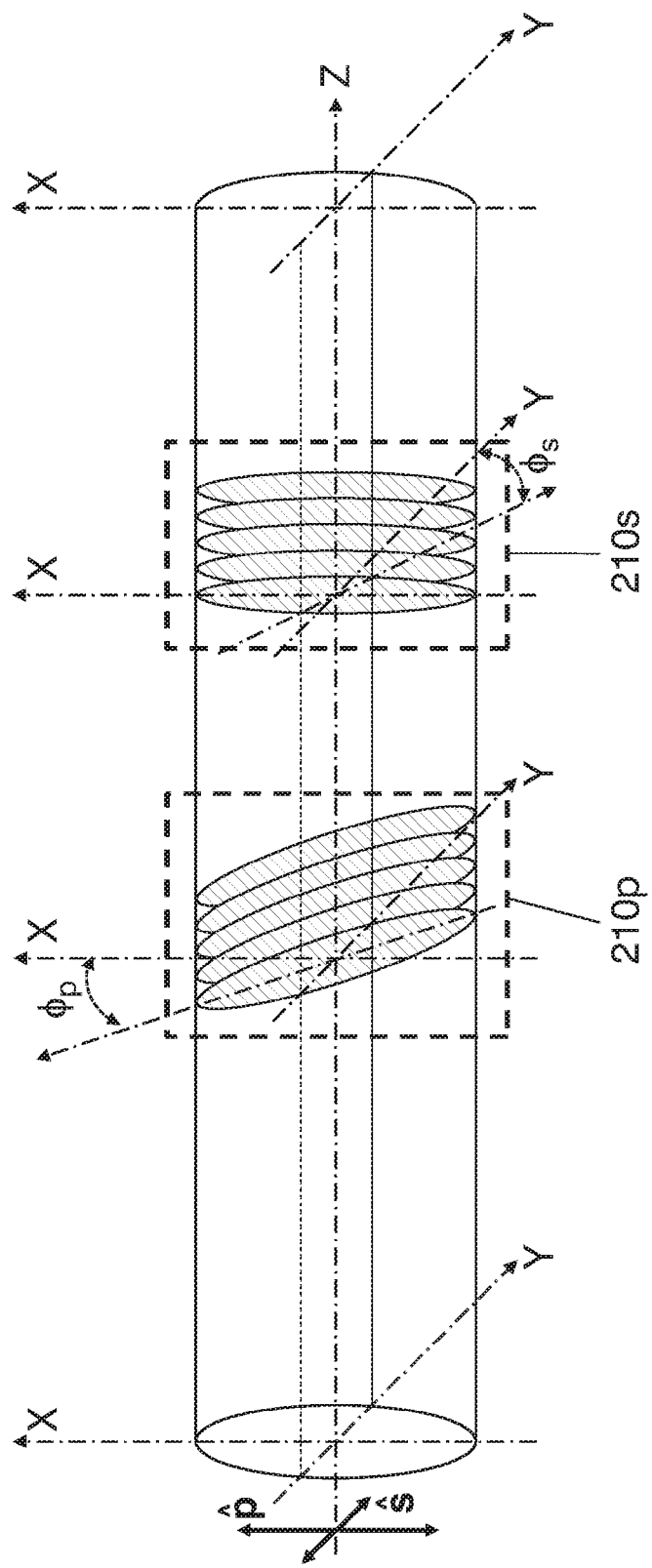
FIG. 4 shows a schematic view of a optical fibre in which the behaviour of Tilted Fibre Bragg Gratings filters used in an embodiment of the present invention is shown.

The behaviour of these type of filters is explained in FIG. 4. If TBFG's grating planes rotates over Y axis of the fibre forming an angle $\phi_p$ with X axis of the fibre, TFBG reflects p component and it will be a Tilted Fibre Bragg Grating for p component (p-TFBG) 210p. And similarly, if TBFG's grating planes rotates over X axis forming an angle $\phi_s$ with Y axis, TFBG reflects s component and it will be a Tilted Fibre Bragg Grating for s component (s-TFBG) 210s. These angles $\phi_p, \phi_s$ must have those values required for the total reflection of polarisation components. Values will depend on the specific characteristic of the fibre as for example, core and cladding refractive indexes.

This way each fibre can be unambiguously marked by assigning to each fibre a binary code of L bits which will depend on of the set of filters located at each fibre. The bit i, $1 \le i \le L$ of the code will have a certain value (e.g. +1) if the filter centred at wavelength $\lambda_i$ is sensitive to a first polarization component (e.g. p) and the opposite value (e.g. −1) if the filter centred at wavelength $\lambda_i$ is sensitive to a second polarization component (e.g. s). Of course, the set of filters of each fibre will be such that the binary code assigned to each fibre is different from the binary code assigned to the rest of the fibres.

In other word, if each filter is characterized by a pair wavelength-polarization (meaning the wavelength to which the filter is tuned and the polarization to which the filter is sensitive), the combination of pairs wavelength-polarization in each set of filters located in each fibre is different from the combination of pairs wavelength-polarization in the rest of set of filters located in the rest of fibres.

2. The light source of the reflectometer located at the Central Office 1 need to be tunable, and capable to send light with both polarization components (or with one of them at will be shown later). So periodically, with a period T, the wavelength emitted by the source can be changed. The light pulse emitted by the reflectometer during a period of time T centred at $\lambda_i$ wavelength will be reflected by those optical narrowband suppression filters centred at the same $\lambda_i$ wavelength. In case of FBG, it will reflect both polarizations, and in case of TFBG will reflect only one of the polarization components of wavelength $\lambda_i$. If the TFBG is p-TFBG 210p it will reflect only the p component, and if it is an s-TFBG 210s, it will reflect only the s component.

3. The reflectometer's receiver also needs to be wavelength and polarization sensitive. When it receives echoes with only one polarization component, it will generate a response which can be mapped into a certain value (e.g. "+1"), and when it receives an echo with the opposite polarization component it will generate a response which can be mapped into a different value (e.g. "−1").

Proposed solution works when it is used for point to point fibre supervision and monitoring. The responses obtained from a sequence of wavelength pulses emitted by the tunable polarization sensitive reflectometer can be mapped automatically with the respective fibre strand, meaning that this fibre is working correctly. And the lack of responses, at the expected distance, to the sequence of wavelength pulses sent by the reflectometer, points the existence of a failure in that fibre.

And it works also for point to multipoint fibre access networks. With proposed solution, when there is no failure in a fibre, there will be response for all the emitted wavelength pulses in only one point, the point located in a known branch of the point-to-multipoint optical access infrastructure where the correct code made of a set 220 of p-TFBGs 210p and s-TFBGs 210s has been installed. Swapping all the codes of a point-to-multipoint optical access infrastructure, the operators will detect which branches are working correctly with no failures, and will also detect by the lack of response at the expected location, which of them have problems. In case of failure, the echo will be the same for all the emitted wavelength pulses and both polarizations: an echo located at the same distance, different from the expected one, which in this case due to the failure contains both polarization components.

So the proposed invention mitigates the ambiguity problem which exists with current reflectometric solutions. However, in some cases, when there are many sets of filters 220 located at the same distance from the Central Office Optical Line Termination 1 OLT 4, suggested solution is not enough. In those cases, the ambiguity problem can be removed completely by means of sending a high auto-correlation and very-low cross correlation binary sequence, like Pseudo Random Binary Sequence (PRBS), 400, from the polarization sensitive tunable reflectometer transmitter 310. In order to detect if one fibre 6 in one branch of a point to multipoint fibre access network is working properly, each chip of the PRBS 400 sent by the reflectometer 300 will use a wavelength, polarization included, from the same set of wavelengths and polarizations used in the set of filters 220 installed in that fibre.

The "chip" and "bit" concepts are analogous terms to refer to a binary sequence unit.

The term chip is used for a first binary sequence which is used in respect to a second binary sequence (e.g. to codify said second binary sequence) with a much longer bit time. The term "chip" is used to distinguish it for the term "bit" of the second binary sequence.

The PRBS 400 used needs to have a high autocorrelation peak, and a very low cross-correlation. So it will be possible to identify the reflection which comes from the targeted set of filters 220 (the targeted fibre in the targeted branch), and when an echo from the reflection on the targeted set of filters 220 will match with each chip of the emitted PRBS 400 sequence and exceeds the correlation threshold used by the receiver 311 of the tunable polarization sensitive reflectometer 300, it will be determined that there is no failure in said fibre.

In an embodiment, the reflection is analysed and compared with the emitted PRBS sequence at a time predefined for each fibre (the time to which the signal reflected by the set of filters must be received according the distance to which the set of filters is located in said fibre).

The technical description of the above proposed solution will be now detailed explained in several proposed embodiments.

Figure 5:
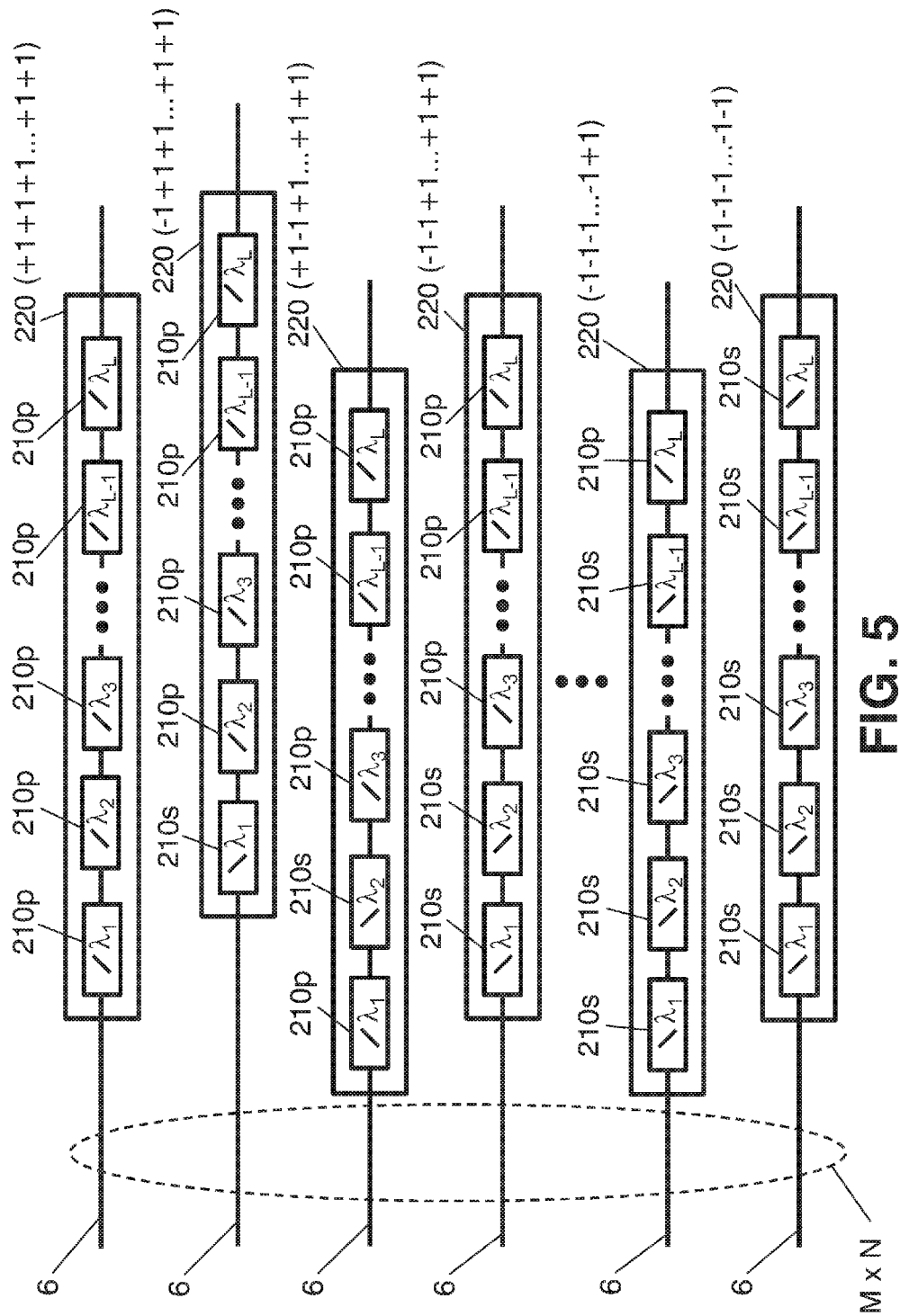
FIG. 5 schematically shows a proposed binary coding scheme for optical fibres using banks of filters according to an embodiment of the present invention.

The proposed invention consists of coding each fibre with a set 220 of filters, which can be either p-TFBGs 210p or s-TFBGs 210s, co-located (approximately) at the same point, as it is shown in FIG. 5.

In FIGS. 5, 6, 7 and 8 /$\lambda_i$ refers to a Tilted Fibre Bragg Grating for p polarization component centred at wavelength $\lambda_i$ and \$\lambda_i$ refers to a Tilted Fibre Bragg Grating for s polarization component centred at wavelength $\lambda_i$.

Each filter of the set 220 of filters used to codified one fibre will be tuned at a different wavelength. Any set of wavelengths could be used. In an embodiment, a set of wavelengths comprised in the U-band (1625 nm-1675 nm), which is the wavelength band reserved by Standardization Definition Organizations (SDOs) for optical outside plant supervision is used.

Figure 2:
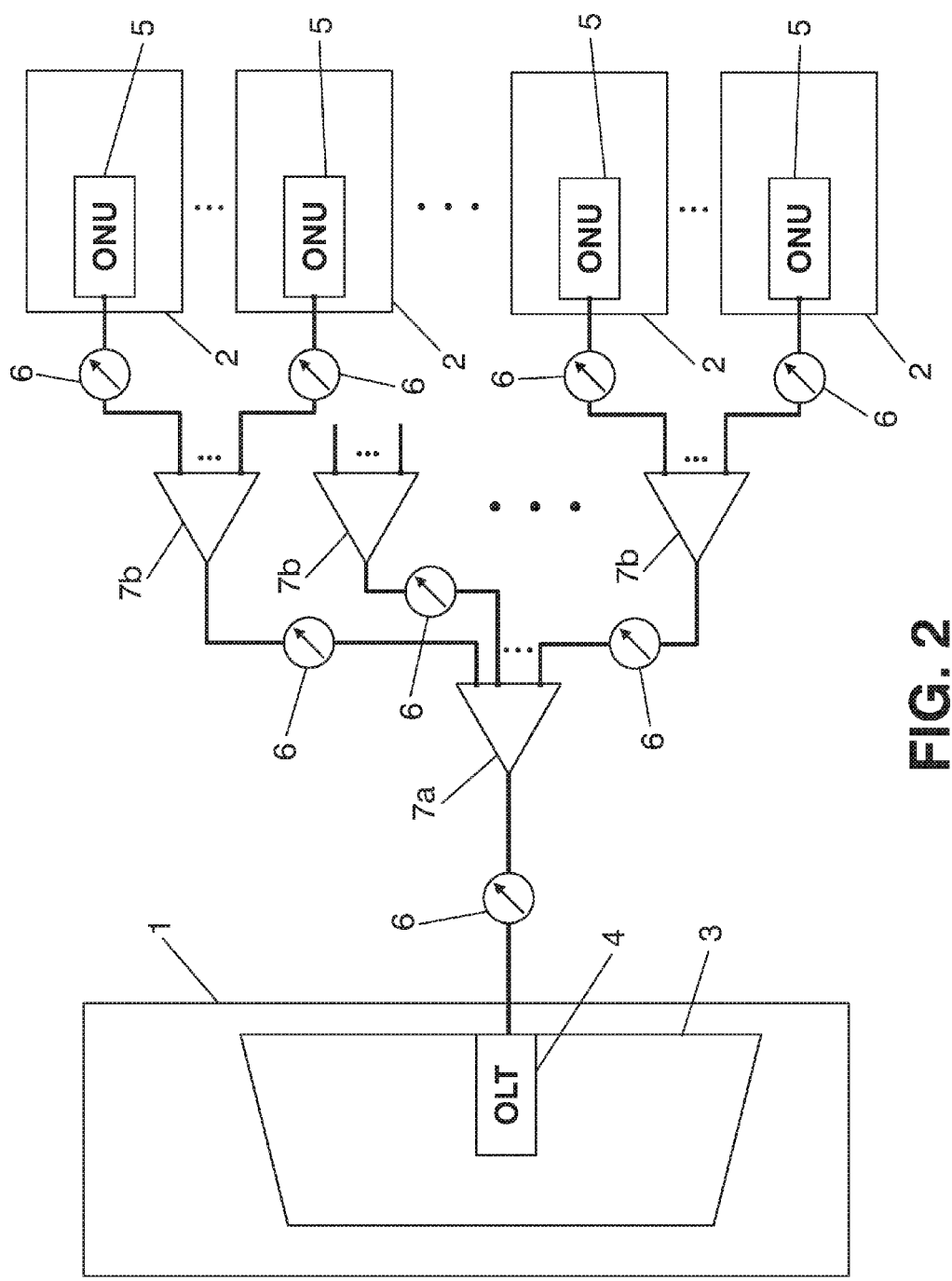
FIG. 2 shows a block diagram of a Passive Optical Access Network.
Figure 3:
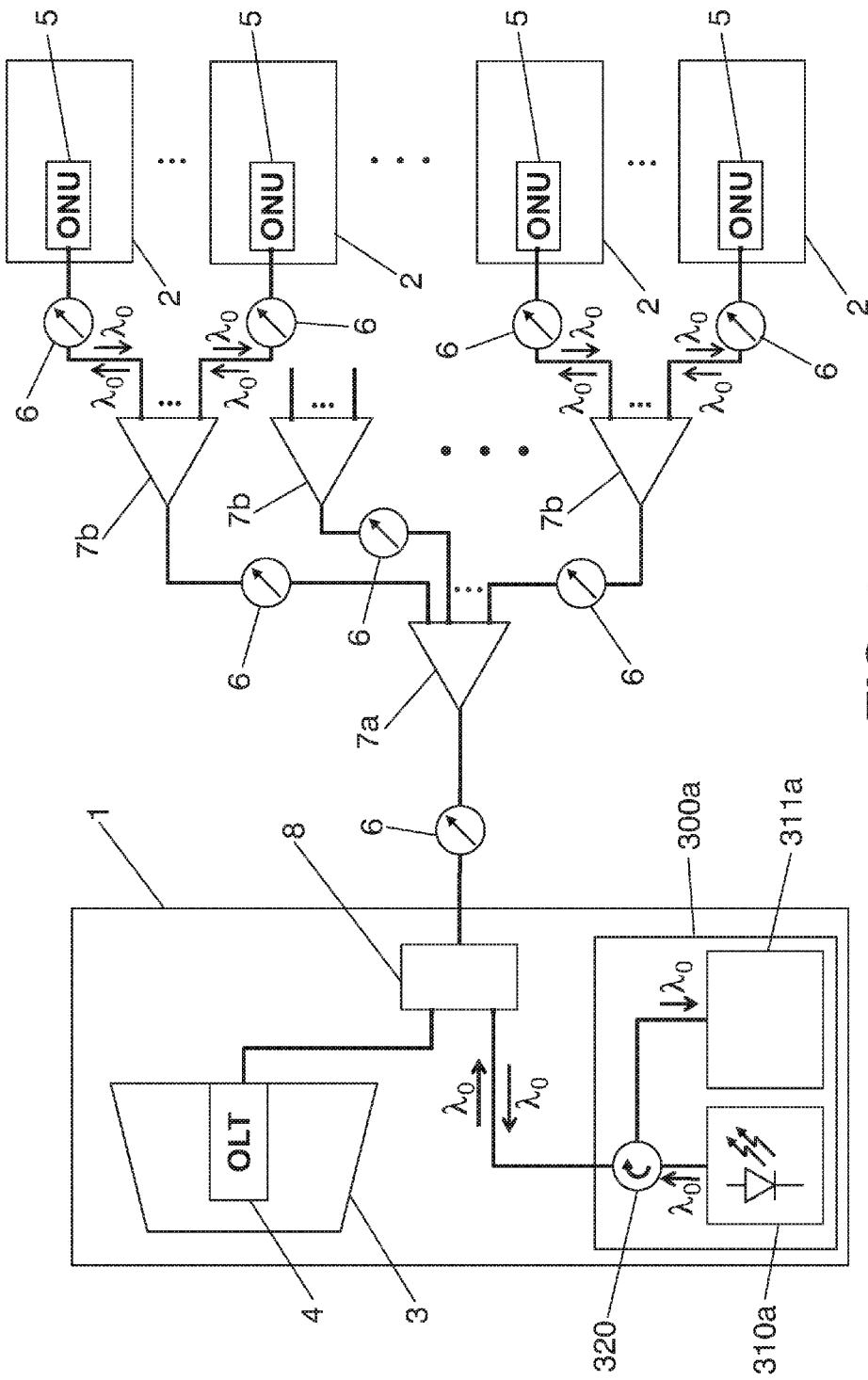
FIG. 3 shows a block diagram of a reflectometry based supervision system in Passive Optical Access Network.

In an embodiment, if the operator has to deploy a number of M×N optical fibres (as the example shown in FIG. 2), L wavelengths will be used for supervision purposes, where L is defined as:

$$L \geq \lceil \log_2(M \times N) \rceil$$

Where ⌈ ⌉ represents the upper integer limit closer to number M×N binary logarithm.

That is, in this embodiment the minimum value of L is $\lceil \log_2(M \times N) \rceil$ but a bigger valued of L can be used.

As an example, if a Telecommunications operator has to deploy sixty-four fibres (M×N=64), it will require only L=6 wavelengths ($\{\lambda_1, \lambda_2, \lambda_3, \lambda_4, \lambda_5, \lambda_6\}$) to monitor the status of the whole set of sixty-four optical fibres. Each fibre 6, at a certain point, will have a set 220 of L p-TFBGs 210p and/or s-TFBGs 210s, each filter centred in one of the wavelengths of the set of wavelengths, as it is shown in FIG. 5.

Each of these sets of filters 220 will be translated into a unique binary code. To do that, for example, as shown in FIG. 5, a +1 will be associated to a p polarization filter and a −1 to a s polarization filter. Using said code scheme, for example, in FIG. 5 the upper fibre will have a set of all p-TFBG filters which will correspond to a binary code +1, +1, +1, +1, +1, +1; the third fibre will have a set of TFBG filters (all p filters except the second one) which will correspond to a binary code: +1, −1, +1, +1. +1. +1 and so on. Of course other codification is possible, for example, using 0 and 1 instead of +1 and −1.

Using this coding scheme based on a bank 220 of TFBG filters, and a tunable polarization sensitive reflectometer, the emission of a train of light pulses, each one centred at a different wavelength will generate a sequence of responses or echoes from each optical fibre. The response or echo to a wavelength pulse reflected by a p-TFBG 210p filter tuned at the same wavelength will include only the p component polarization components, while the echo from a wavelength pulse reflected by an s-TFBG 210s filter tuned at the same wavelength will include only one polarization component, the s component. So if the reflectometer receiver is polarization sensitive, it will provide a different response in the case that the received echo comes from the reflection at a p-TFBG 210p than the response in the case the echo comes from the reflection at a s-TFBG 210s.

The reflectometer may know the distance where each set of filters in each fibre is located (for example, because it can be registered by Operators' Outside Plant teams during the fibre roll-out phase).

Figure 6:
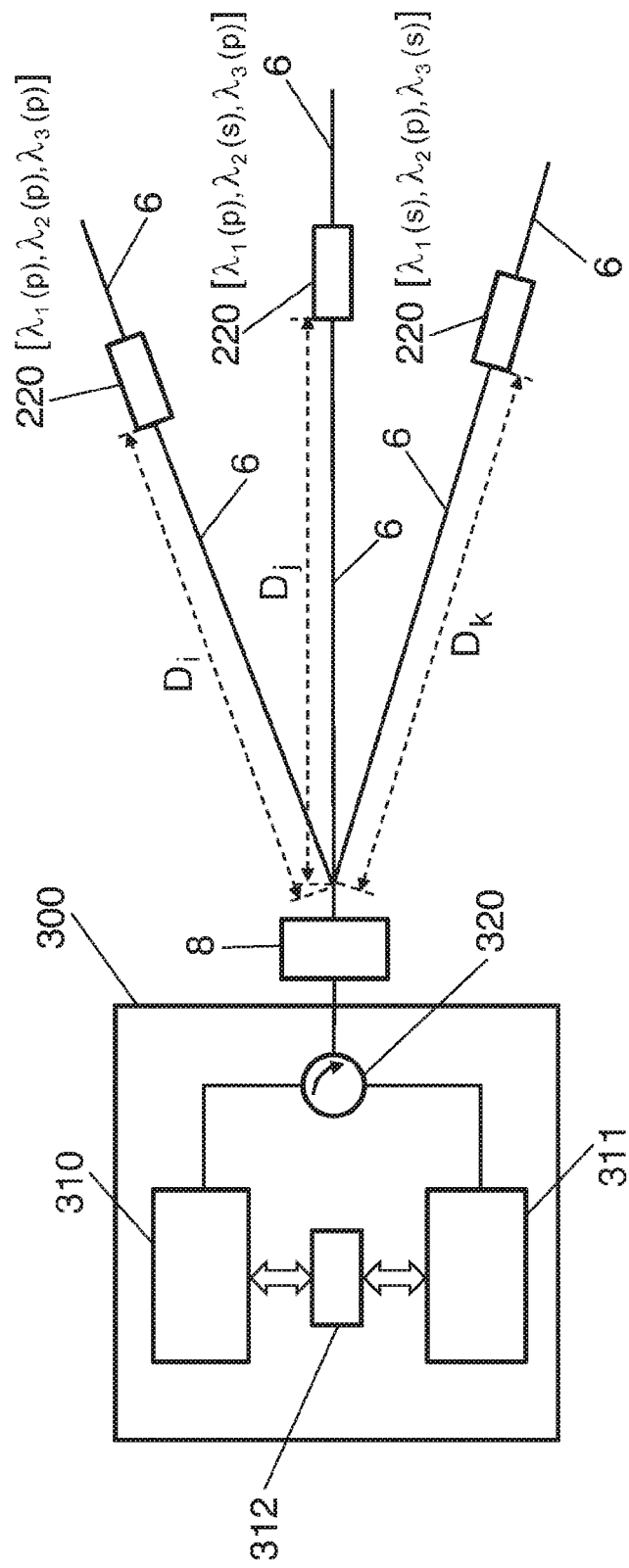
FIG. 6 shows a block diagram of a reflectometry based supervision system in an Optical Access Network in an scenario where there are no failures according to an embodiment of the present invention is shown.
Figure 7:
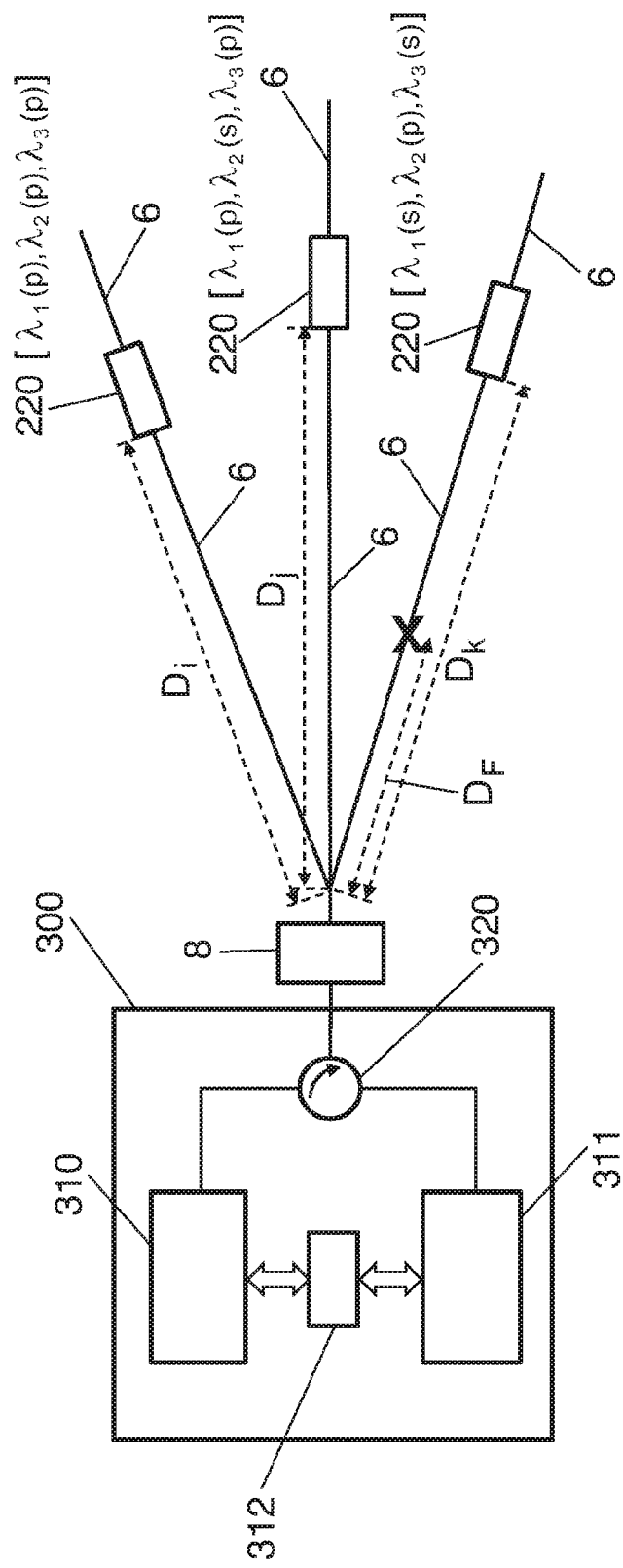
FIG. 7 shows a block diagram of a reflectometry based supervision system in an Optical Access Network in an scenario where there are one failure according to an embodiment of the present invention is shown.

FIGS. 6 and 7 show a block diagram of an Optical Access Network using a reflectometer (300) according to an embodiment of the present invention, in different scenarios. In the shown examples, it is supposed that only a set of 3 filters (3 wavelenghts) are used and 3 fibres i, j and k are shown. The set 220 of filters for each fibre is shown in the figures. In these fibres the set of filters is located at distances Di, Dj and Dk respectively from the Central Office (and therefore from the reflectometer).

The reflectometer 300 will have a transmitter 310, a receiver 311 and a block 312 which controls the transmitters and receiver of the polarization sensitive tunable reflectometer 300. A circulator 320 and an Automated Distribution Frame 8 (which permits that the same reflectometry based supervision system can be shared between the multiple PON trees deployed from the same Central Office) are also shown in the figures In FIG. 6, it is supposed that there are no failures. The emission of a train of light pulses, each one centred at a different wavelength will therefore generate an echo response (received at the reflectometer) as shown in table 1.

TABLE 1

| Wavelenght Pulse | Echo from fibre i at distance Di | Echo from fibre j at distance Dj | Echo from fibre k at distance Dk |
|---|---|---|---|
| $\lambda_1(p)$ | Yes | Yes | No |
| $\lambda_1(s)$ | No | No | Yes |
| $\lambda_2(p)$ | Yes | No | Yes |
| $\lambda_2(s)$ | No | Yes | No |
| $\lambda_3(p)$ | Yes | Yes | Yes |
| $\lambda_3(s)$ | No | No | No |

So, translating it to binary code, the echo received at distance Di is +1, +1, +1; the echo received at distance Dj is +1, −1, +1 and the echo received at distance Dk is −1, +1, −1

In FIG. 7, it is supposed that there is a failure in fibre k at a distance $D_F$. The emission of a train of light pulses, each one centred at a different wavelength will therefore generate an echo response (received at the reflectometer) as shown in table 2.

TABLE 2

| Wavelenght Pulse | Echo from fibre i at distance Di | Echo from fibre j at distance Dj | Echo from fibre k at distance Dk | Echo from fibre k at distance $D_F$ |
|---|---|---|---|---|
| $\lambda_1(p)$ | Yes | Yes | No | Yes |
| $\lambda_1(s)$ | No | No | No | Yes |
| $\lambda_2(p)$ | Yes | No | No | Yes |
| $\lambda_2(s)$ | No | Yes | No | Yes |
| $\lambda_3(p)$ | Yes | Yes | No | Yes |
| $\lambda_3(s)$ | No | No | No | Yes |

There will be no echo from fibre k at distance $D_k$ as the pulse does not reach said distance and at distance $D_F$ all the wavelengths and all the polarizations will be reflected due to the failure.

So, translating it to binary code, the echo received at distance Di is +1, +1, +1 and the echo received at distance Dj is +1, −1, +1. The echo received at distance Dk will not correspond to any binary sequence as the response include echoes for the p polarization and the s polarization.

So, when there is a response at a certain distance from the central office (CO) on the emitted wavelength pulses, polarization included, which compounds the code assigned to a certain fibre (that, as stated before will depend on the set of filters of said fibre) means that there is no failure on said fibre.

That is, in an embodiment, in order to know if there has been a failure in a certain fibre, the received signal received at a time predefined for each fibre (the time to which the signal reflected by the set of filters must be received according to the distance to which the set of filters is located in said fibre) is translated into a binary code which is obtained by assigning to each bit i, $1 \leq i \leq L$, a first value if the received signal at wavelength $\lambda_i$ has a first polarization component and a second value if the reflected signal at wavelength $\lambda_i$ has a second polarization component, said binary code is compared with the binary code assigned to said fibre and it is determined that there is a failure in said fibre if the codes do not match.

This is the simplest way to check the fibre. As it will be shown below, the use of PRBS sequences with high auto-correlation and very low cross-correlation will be more secure and less ambiguous.

A different sequence of pulses, each one identified by a wavelength and polarisation, is sent. All those filters which have a polarisation component at the same wavelength and polarization than those emitted pulses, will sent echoes. But there will be only one fibre that will sent echoes at the same location for all the pulses emitted from the reflectometer transmitter.

In the case illustrated on FIGS. 6 and 7, the code assigned to fibre i will be +1, +1, +1, the code assigned to fibre j will be +1, −1, +1, and the code assigned to fibre k will be −1, +1, −1. In the case of FIG. 6, as the echo received for each fibre at the corresponding distances correspond to said codes, it means that there is no failure in any of the shown fibres.

When there is no response at the same distance from the CO on any of the emitted wavelength pulses, polarization included, which compounds the code assigned to that fibre, that means that there is a failure on that fibre, and the analysis of echoes received will inform about the failure's features. In the case of FIG. 7, as there is no echo response received at distance k which corresponds to the code of fibre k, it means that there is a failure in fibre k.

Figure 8:
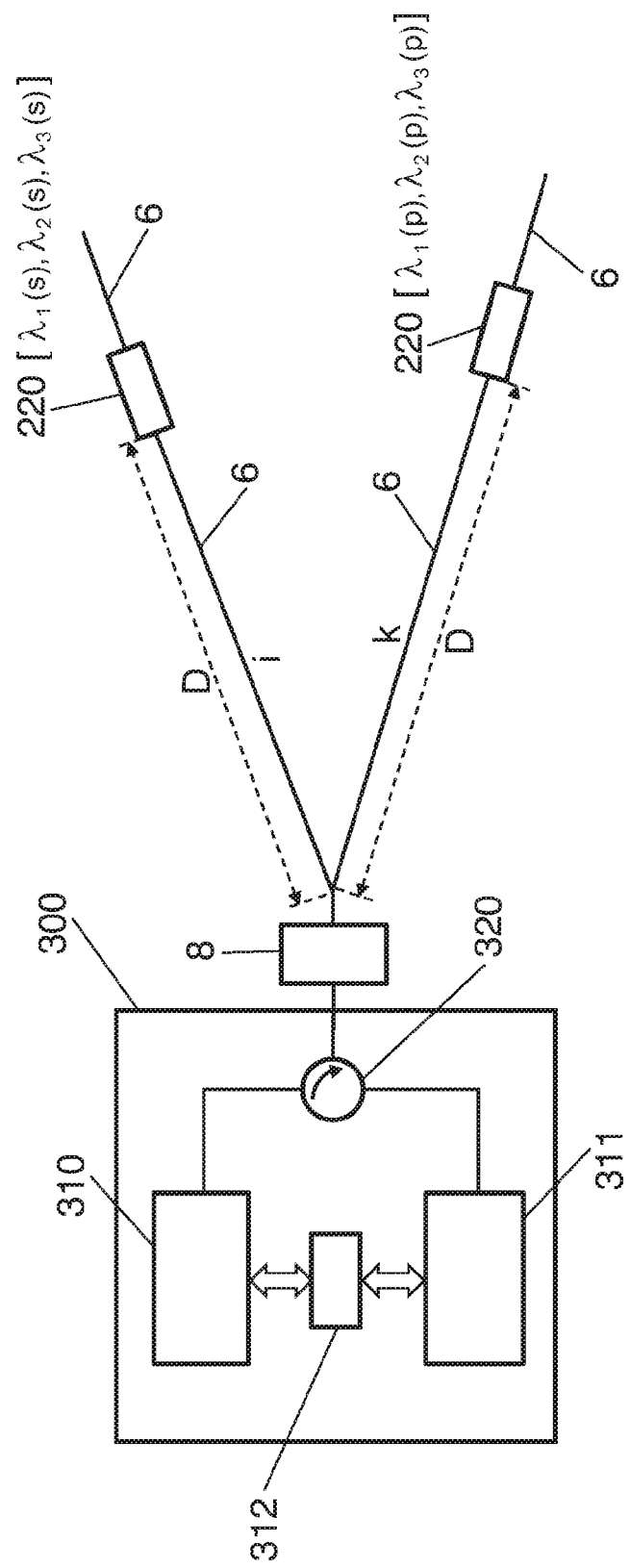
FIG. 8 shows a block diagram of a reflectometry based supervision system in an Optical Access Network in an scenario where disambiguation is needed according to an embodiment of the present invention is shown.

FIG. 8 shows the scenario when there are two fibres (i and k) with their corresponding set of filters 220 located at the same distance from the Central Office 1 (from the reflectometer). The emission of a train of light pulses, each one centred at a different wavelength will therefore generate an echo response (received at the reflectometer) as shown in table 3 if there is no failure in any of the fibres.

TABLE 3

| Wavelenght Pulse | Echo at distance D | Echo from fibre i at distance D | Echo from fibre k at distance D |
|---|---|---|---|
| $\lambda_1(p)$ | Yes | No | Yes |
| $\lambda_1(s)$ | Yes | Yes | No |
| $\lambda_2(p)$ | Yes | No | Yes |
| $\lambda_2(s)$ | Yes | Yes | No |
| $\lambda_3(p)$ | Yes | No | Yes |
| $\lambda_3(s)$ | Yes | Yes | No |

If there is a failure in one of the fibres, as each set of filters 220 is made of Tilted Fibre Bragg Gratings tuned at different wavelengths and polarizations, the receiver located at the Central Office 1 will receive the right sequence of echoes located at the position corresponding to the distance of the set of filters, only in the case of the non-broken fibre. And in the case of the damaged fibre 6, the response to the whole sequence of wavelength pulses will be always echoes which include both polarization components (so the response will not map into the binary code assigned to said fibre) and it will be located at the position corresponding to the distance of the failure ($D_F$) that will be a different position than the set of filters 220 assigned to that fibre.

The solution proposed in the previous paragraphs will therefore mitigate the ambiguity problem. However, in case there are many different sets of filters 220, each one located at different branches of the point to multipoint optical access network, but all of them at the same distance from the Central Office OLT, the proposed solution is not enough.

In that case, in an embodiment of the present invention, it is proposed a mechanism to remove completely the ambiguity problem leveraged on the sets of filters 220 by means of using PRBS (Pseudo Random Binary Sequences) sequences 400 in the tunable polarization sensitive reflectometer transmitter 310. Each of the chips of a PRBS 400 will be mapped into a wavelength with the right polarization components (p or s), as the filters 210p and/or 210s which compounds the set of filters 220 in the branch which is going to be monitored For each branch's whose state wants to be confirmed, reflectometer's transmitter must sent a sequence, in which each chip is transmitted using only those wavelengths and polarisation components used by targeted branch's filter. Using PRBS sequences 400 with a high autocorrelation peak and very low cross-correlation, it will be feasible to identify the response from the right set of filters 220. To do so, PRBS sequences like Gold sequences, quasi-Gold sequences or Kassami complementary sets of sequences can be used because all of them are maximum length PRBS sequences 400 with high autocorrelation and very low cross-correlation properties, which in combination with the binary code implemented by a set of filters 220, generates a specific trace or signature, different from other branches.

It is not necessary to use the same PRBS sequence for all the fibres. The same sequence can be used (mapping its chips should have to be mapped into wavelengths and polarizations used by the fibre under test), but it is possible to use different sequences per each fibre (always mapping its bits into the wavelengths and polarizations used by the fibre under test).

Figure 9:
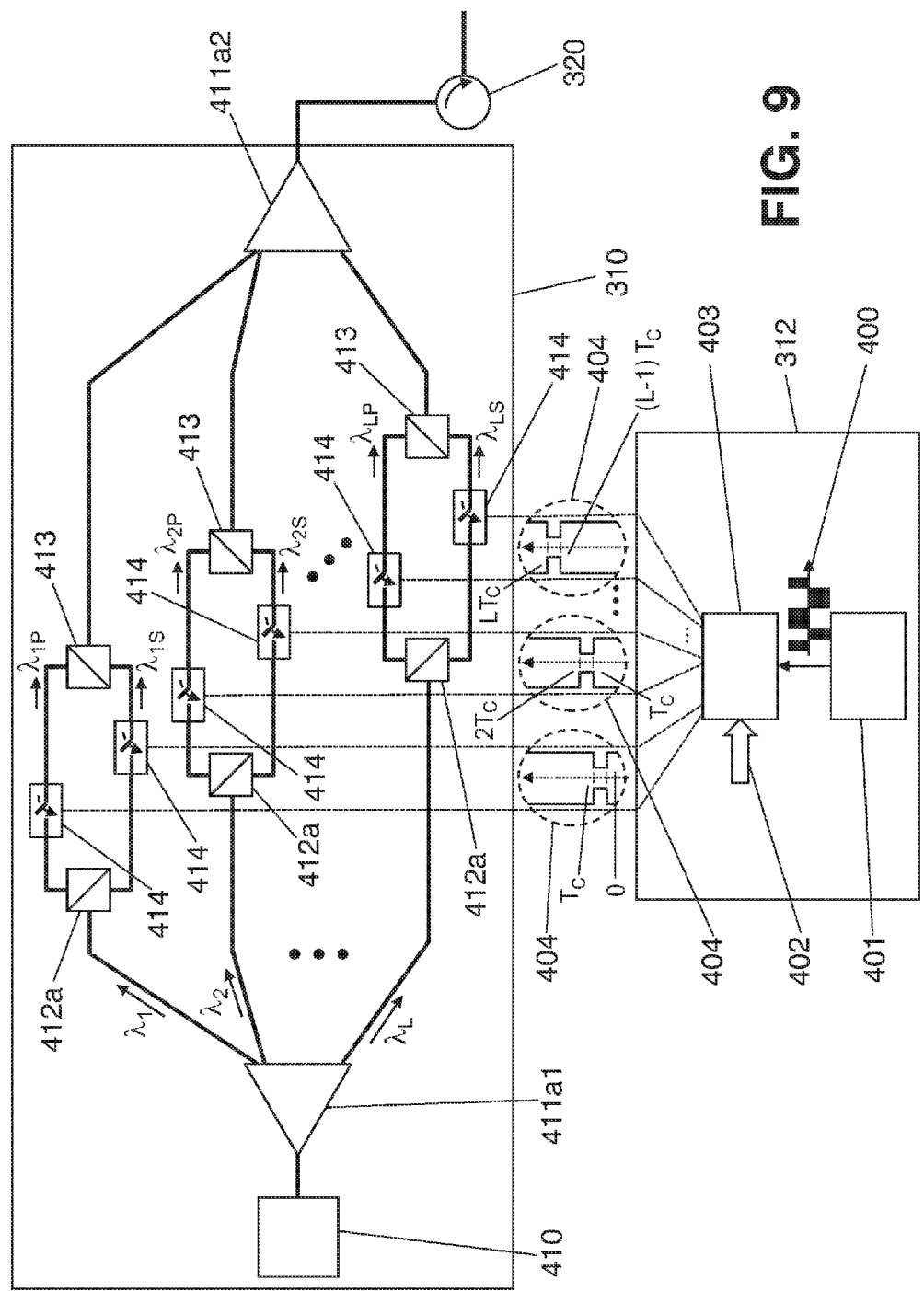
FIG. 9 shows a block diagram of the transmitter of the tunable polarization sensitive reflectometer according to an embodiment of the invention.
Figure 10:
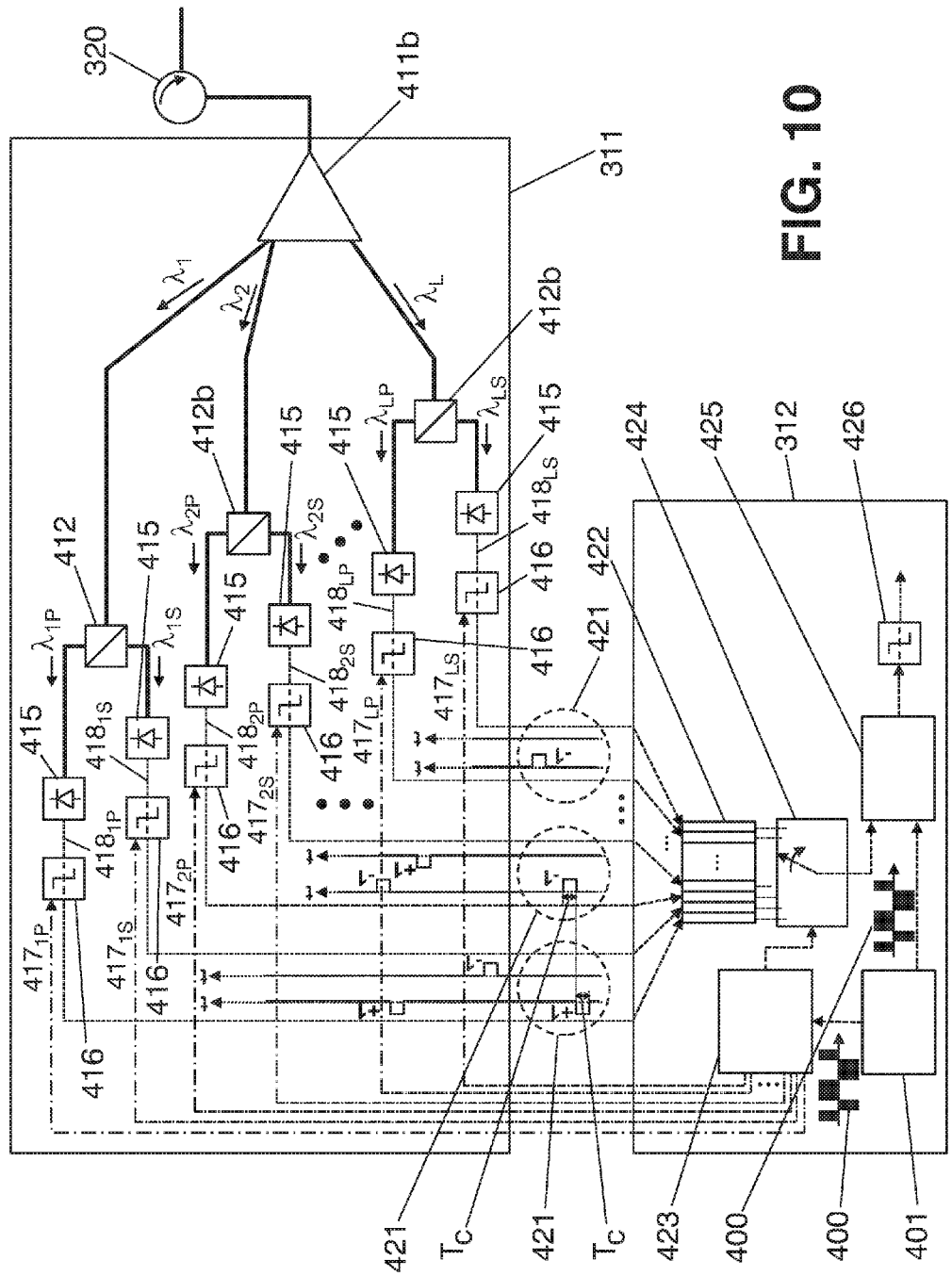
FIG. 10 shows a block diagram of the receiver of the tunable polarization sensitive reflectometer according to an embodiment of the invention.

In FIGS. 9 and 10 it is shown a block diagram of the transmitter (310) and the receiver (311) respectively of the tunable polarization sensitive reflectometer transmitter used in this embodiment of the invention. The optical paths are drawn in solid lines and the electrical paths are drawn in dashed lines.

In order to implement the proposed solution, transmitter 310 includes a broadband source of light 410. An arrayed waveguide grating (AWG) 411a1 splits light that comes from the source of light 410 into different light components, each one centred at a different wavelength $\lambda_i$ ($1 \leq i \leq L$) of a set of wavelengths $\{\lambda_1, \lambda_2, \ldots, \lambda_L\}$ (which will correspond to the set of wavelengths of the filters 210p and/or 210s included in the sets of filters 220 located at a certain distance in each fibre, used to codify the fibres). Each of these light components $\lambda_i$ coming from the AWG 411a1 is divided by a polarization beam combiner 412a into two orthogonally polarized components p and s ($\lambda_{i,p}$ and $\lambda_{i,s}$). Once the light coming from the source 410 is divided into p and s components for each of the wavelength of the set of wavelengths, transmitter 310 can send a sequence of wavelengths with the right polarization according to a PRBS sequence 400 which have been previously mapped to the wavelengths and polarisations which match the wavelengths and polarizations used by the set of filters 220 used to codify the fibre 6 under test.

For instance, in case there are 64 fibres, it will be needed only 6 (=log$_2$64) different wavelengths ($\lambda_1$, $\lambda_2$, $\lambda_3$, $\lambda_4$, $\lambda_5$, $\lambda_6$), and each fibre will be marked with a set of six TFBG filters, each one centred at one of those wavelengths. For example in the following way:

Fibre number 1 will be marked with the filter set: $\lambda_1(s)$, $\lambda_2(s), \lambda_3(s), \lambda_4(s), \lambda_5(s), \lambda_6(s)$, which represents binary code $\{-1, -1, -1, -1, -1, -1\}$.

Fibre number 2 will be marked with the filter set: $\lambda_1(s)$, $\lambda_2(s), \lambda_3(s), \lambda_4(s), \lambda_5(s), \lambda_6(p)$, which represents binary code $\{-1, -1, -1, -1, -1, +1\}$.

Fibre number 3 will be marked with the filter set: $\lambda_1(s)$, $\lambda_2(s), \lambda_3(s), \lambda_4(s), \lambda^5(p), \lambda_6(s)$, which represents binary code $\{-1, -1, -1, -1, +1, -1\}$.

Fibre number 4 will be marked with the filter set: $\lambda_1(s)$, $\lambda_2(s), \lambda_3(s), \lambda_4(s), \lambda_5(p), \lambda_6(p)$, which represents binary code $\{-1, -1, -1, -1, +1, +1\}$.

Fibre number 5 will be marked with the filter set: $\lambda_1(s)$, $\lambda_2(s), \lambda_3(s), \lambda_4(p), \lambda_5(s), \lambda_6(s)$, which represents binary code $\{-1, -1, -1, +1, -1, -1\}$.

Fibre number 6 will be marked with the filter set: $\lambda_1(s)$, $\lambda_2(s), \lambda_3(s), \lambda_4(p), \lambda_5(s), \lambda_6(p)$, which represents binary code $\{-1, -1, -1, +1, -1, +1\}$.

Fibre number 7 will be marked with the filter set: $\lambda_1(s)$, $\lambda_2(s), \lambda_3(s), \lambda_4(p), \lambda_5(p), \lambda_6(s)$, which represents binary code $\{-1, -1, -1, +1, +1, -1\}$.

Fibre number 8 will be marked with the filter set: $\lambda_1(s)$, $\lambda_2(s), \lambda_3(s), \lambda_4(p), \lambda_5(p), \lambda_6(p)$, which represents binary code $\{-1, -1, -1, +1, +1, +1\}$.

Fibre number 9 will be marked with the filter set: $\lambda_1(s)$, $\lambda_2(s), \lambda_3(p), \lambda_4(s), \lambda_5(s), \lambda_6(s)$, which represents binary code $\{-1, -1, +1, -1, -1, -1\}$.

. . .

Fibre number 63 will be marked with the filter set: $\lambda_1(p)$, $\lambda_2(p), \lambda_3(p), \lambda_4(p), \lambda_5(p), \lambda_6(s)$, which represents binary code $\{+1, +1, +1, +1, +1, -1\}$.

Fibre number 64 will be marked with the filter set: $\lambda_1(p)$, $\lambda_2(p), \lambda_3(p), \lambda_4(p), \lambda_5(p), \lambda_6(p)$, which represents binary code $\{+1, +1, +1, +1, +1, +1\}$ For each tested fibre, the mapping is performed by block 403. Block 312 of the reflectometer controls the whole 310 transmitter of the polarization sensitive tunable reflectometer 300. For that control, PRBS sequence 400 coming from the PRBS generator 401 is mapped into a set of wavelengths and polarizations according to information 402, which consists of the wavelengths and polarizations used by the filters which compounds the set of filters 220 used by the fibre 6 that is going to be monitored. Block 403 maps information 402 and the PRBS sequence 400, and generates a set of electric signals 404 which controls the on-off optical switches 414 in the paths of each polarization component $\lambda_i(p)$ and $\lambda_i(s)$. In FIG. 9, it is shown a possible example of said electric signals 404 for an specific case. So, during each chip period $T_c$, only one wavelength $\lambda_i$ with a unique polarization, p or s, is sent by the transmitter 310.

In case of using Gold sequences, which are a type of PRBS sequences, an example of 31 chip length sequence is $\{+1, +1, +1, +1, +1, -1, -1, +1, +1, -1, +1, -1, -1, +1, -1, -1, -1, -1, +1, -1, +1, -1, +1, +1, +1, -1, +1, +1, -1, -1, -1\}$. This Gold sequences have a very high autocorrelation and a very low cross correlation with the remainder 32 sequences of 31 chips Gold codes of the same family.

Each chip of the PRBS sequence should be mapped into the sets of wavelength and polarization used by filter 220 that codes or identifies the fibre under test. To do said mapping, for each fibre to be supervised, when the chip has a +1 value, a pulse using one of the wavelengths who has a +1 polarization (p polarization in this example) in the fibre to be supervised, will be sent with the corresponding polarization and when the chip has a −1 value, a pulse using one of the wavelengths who has a −1 polarization (s polarization in this example) in the fibre to be supervised, will be sent with the corresponding polarization. For example, said mapping will be made in the following way, using the same coding used in the example of 64 fibres showed above:

In the case of fibre number 2, all +1 chips will have to be mapped into $\lambda_6(p)$, while −1 chips would be mapped into any of the following wavelengths and polarizations: $\lambda_1(s), \lambda_2(s), \lambda_3(s), \lambda_4(s)$ or $\lambda_5(s)$. For instance, the aforementioned Gold sequence could be mapped into the following sequence of wavelengths and polarisations for fibre number 2: $\{\lambda_6(p), \lambda_6(p), \lambda_6(p), \lambda_6(p), \lambda_6(p), \lambda_1(s), \lambda_2(s), \lambda_6(p), \lambda_6(p), \lambda_3(s), \lambda_6(p), \lambda_4(s), \lambda_5(s), \lambda_6(p), \lambda_1(s), \lambda_2(s), \lambda_3(s), \lambda_4(s), \lambda_6(p), \lambda_5(s),$ $\lambda_6(p)$, $\lambda_1(s)$, $\lambda_6(p)$, $\lambda_6(p)$, $\lambda_6(p)$, $\lambda_2(s)$, $\lambda_6(p)$, $\lambda_6(p)$, $\lambda_3(s)$, $\lambda_4(s)$, $\lambda_5(s)$}, but any other combination which keeps +1 and −1 mapping would also be valid.

In the case of fibre number 4, +1 chips would be mapped into $\lambda_5(p)$ or $\lambda_6(p)$, while −1 chips would be mapped into any of the following wavelengths and polarizations: $\lambda_1(s)$, $\lambda_2(s)$, $\lambda_3(s)$ or $\lambda_4(s)$.

In the case of fibre number 7, +1 chips would be mapped into any of the following wavelengths and polarizations: $\lambda_4(p)$ or $\lambda_5(p)$, while −1 chips would be mapped into any of the following wavelengths and polarizations: $\lambda_1(s)$, $\lambda_2(s)$, $\lambda_3(s)$ or $\lambda_6(s)$ And in the case of fibre number 8, +1 chips would be mapped into any of the following wavelengths and polarizations: $\lambda_4(p)$, $\lambda_5(p)$ or $\lambda_6(p)$, while −1 chips would be mapped into any of the following wavelengths and polarisations: $\lambda_1(s)$, $\lambda_2(s)$ or $\lambda_3(s)$.

Disambiguation based on high auto-correlation and low cross-correlation binary sequences works only while fiber is coded with both p filters and s filters. Hence, in the two cases in which fibers are coded with only one type of polarization, only with p filters or only with s filters (e.g. fibres 1 and 64 in the above example), it is not possible to use the suggested approach and mapping.

Of course, fibre coding mechanism based on a set of filters 220 made either with p or s filters can be used also for fibre supervision and monitoring. For those fibres, (where only p-TFBG or s-TFBG are used for the coding), a sequence of wavelengths and polarizations which match with those ones used to code the fibre will be used (using only p polarization in the case of the fibre only having p filters and using only s polarization in the case of the fibre only having s filters). The only problem is that said sequences will not have so high auto-correlation and low cross-correlation properties as the sequences used for the rest of the fibres. For instance, to check fibre 1 of the aforementioned example, it can be used the following random sequence {$\lambda_6(s)$, $\lambda_6(s)$, $\lambda_6(s)$, $\lambda_6(s)$, $\lambda_6(s)$, $\lambda_1(s)$, $\lambda_2(s)$, $\lambda_6(s)$, $\lambda_6(s)$, $\lambda_3(s)$, $\lambda_6(s)$, $\lambda_4(s)$, $\lambda_5(s)$, $\lambda_6(s)$, $\lambda_1(s)$, $\lambda_2(s)$, $\lambda_3(s)$, $\lambda_4(s)$, $\lambda_6(s)$, $\lambda_5(s)$, $\lambda_6(s)$, $\lambda_1(s)$, $\lambda_6(s)$, $\lambda_6(s)$, $\lambda_6(s)$, $\lambda_2(s)$, $\lambda_6(s)$, $\lambda_6(s)$, $\lambda_3(s)$, $\lambda_4(s)$, $\lambda_5(s)$ } which would generate a set of 31 echoes, all of them located at the same point where {$\lambda_1(s)$, $\lambda_2(s)$, $\lambda_3(s)$, $\lambda_4(s)$, $\lambda_5(s)$, $\lambda_6(s)$} set of filters 220 is located at fibre number 1. A shorter sequence with less than 31 pulses could be used.

In another embodiment, the set of filters used to code the fibres will always be composed by p and s filters, that is, no fibers is coded with only p or only s filters. This will reduce the number of fibres that can be monitorized (for instance, in the case of having 6 different wavelengths (L=6), only 62 fibres will be monitorized instead of 64) but will allow the use of high auto-correlation and low cross-correlation sequences for all the fibres minimizing the desambiguation problems.

Polarization beam combiners 413 combines the signals of different polarizations at the same wavelength, and AWG 411a2 combines all the wavelengths' paths into a common output which is injected into the PON network using a circulator 320.

Said output will only be used to test a certain fibre which corresponds to the PRBS sequence, so to test different branches, different outputs will be generated.

Receiver 311 of tunable polarization sensitive reflectometer 300 splits the received optical signal (received from a circulator 320) into wavelengths components (one for each wavelength of the set of wavelengths {$\lambda_1, \lambda_2, \ldots, \lambda_L$}), by means of AWG 411b. In turn, each of the received wavelengths $\lambda_i$, ($1 \le i \le L$) is divided into its polarization components ($\lambda_{ip}$ and $\lambda_{is}$) using polarization beam splitters (PBS) 412b. Both outputs from each PBS 412b are sent to optical detectors 415. Output signal 418 (418$_{ip}$ the output from optical detector 415 for $\lambda_{ip}$ and 418$_{is}$ the output from the optical detector 415 for $\lambda_{is}$, with $1 \le i \le L$) from each optical detector 415 is compared by means of comparators 416 with a threshold level 417 (417$_{ip}$ for $\lambda_{ip}$, 417$_{iS}$ for $\lambda_{is}$) controlled by block 423. Said threshold could be the same for all the wavelengths and polarisations, but it also could be adjustable and different for each wavelengths and polarisations. In case the output from optical detector 415 exceeds the threshold level a symbol ("+1" or "−1") will be generated by the comparator and stored in block 422.

In an embodiment, if a +1 and a −1 is generated for the same wavelength at the same time (that is, for both polarizations the output exceeds the threshold), no symbol is stored in block 422 and an error may be generated.

In FIG. 10, it is shown a possible example of the output of the comparator 421 for an specific case. Block 422 stores the sequence of symbols ("+1" or "−1") per each wavelength and polarization. Block 423 controls a switch 424 which selects in accordance to the PRBS sequence 400 the output from block 422. Output of switch 424 is a sequence which is correlated with PRBS 400, coming from the PRBS generator 401, in a correlator 425. That is, depending on the PRBS, and the wavelength and polarisation set used to transmit that PRBS, block 423 will address through switch 424 those positions of block 422 (basically using a memory in which each bit corresponds to a wavelengths, polarisation and sequence position) and extracts the bits of the sequence that must be correlated with the emitted PRBS. Output signal from correlator 425 is compared with a threshold detection level at the comparator 426. If correlator's output signal exceeds the detection threshold, it will mean that the response from the right set of filters 220 has been received and the fibre 6 under test is ok up to the position where that set of filters 220 is located.

In case during optical fibre cable 1000 roll-out appears a phase shift between TFBGs 210 reference axis and the reference axis in the polarization sensitive tunable reflectometer 300, the phase shift can be solved taken into account simultaneously two sequences from block 422, the sequence which corresponds to the emitted set of wavelengths and polarizations (e.g. {$\lambda_{1p}, \lambda_{2s}, \lambda_{2s}, \lambda_{3s}, \ldots, \lambda_{(L-1)p}, \lambda_{Ls}$}) and its opposite sequence (i.e. $\lambda_{1s}, \lambda_{2p}, \lambda_{3p}, \ldots, \lambda_{(L-1)s}, \lambda_{Lp}$}). Both of them will have to be correlated with the PRBS 400 sequence, and if at least in one case the correlation result exceeds threshold level, fibre 6 under test works correctly. That is, in case of a phase shift, if sets of filters 220 have been implemented during fibre fabrication process, that phase shift will affect to all of them in the same way and that shift can be detected and compensated for. In case sets of filters 220 have been inserted, phase shift will affect between those pairs of complementary filters (i.e. those ones in which for each TFBG at the same wavelength, they have opposite polarisations), and with the proposed solution and information of filters 220 location (registered during the fibre cable roll-out) phase shift effect can be corrected.

In case there is no response at the comparator's 426 output (i.e. correlator's 425 output signal does not exceed the threshold), that means that fibre 6 under test have a problem (a failure) located between the Central Office 1 and the location of the fibre's set of filters 220. In that case, the set of signals 418 which corresponds to the wavelengths and polarizations used by the set of filters 220 of the fibre 6 under test, will be used by a conventional time domain reflectometer (electrical one) to determine where the problem is located. That is, if the fibre failure is located between the Central Office 1 and the set of filters 220 used to code that fibre, reflection will happen before set of filters 220 location, and the reflection will affect to any wavelengths and polarisation components emitted by the reflectometer. In that case, analyzing received echoes in the same way that a conventional reflectometer does, and taking into account the responses from the remainder sets of filters 220 it is possible to isolate and locate the problem.

And simultaneously, if there is response at the comparator's 426 output, the set of signals 418 made of those ones which are complementary of the wavelengths and polarisations used by the set of filters 220 of the fibre 6 under test (i.e. if the set of filters 220, for the wavelength $\lambda_i$, reflects polarization p, signal for s polarization, $418_{is}$, must be considered) can be used to detect failures beyond the position of the set of filters 220 in the fibre 6 under test. To do so, that set of signals will be used by a conventional time domain reflectometer (electrical one) to determine where the problem, beyond the set of filters 220, is located.

That is, if the problem is located beyond set of filters 220 use to code one fibre, that set of filters 220 will reflect some polarisation components, and will let pass through it the opposite polarisation components, that later will be reflected by a fibre failure (if any). Thus, that failure will generate an echo for the complementary sets of polarisations that with the suggested solution will be detected by the reflectometer 300b. For instance, if one fibre is coded or labelled by the set of filters 220 $\{\lambda_1(p), \lambda_2(s), \lambda_3(p), \lambda_4(s), \lambda_5(p), \lambda_6(s)\}$, that set of filters will reflect all those polarisation components, but in turn, it will let pass through it the remainder polarisation components (i.e., $\{\lambda_1(s), \lambda_2(p), \lambda_3(s), \lambda^4(p), \lambda_5(s), \lambda_6(p)\}$) that later will be reflected by the failure located beyond the set of filters 220. So, reflectometer 300, apart from the echo which corresponds to the reflection of the polarisation components comprised by the set of filter 220 at the point where this set of filter 220 is located, it will also detect an additional echo due to the reflection of the complementary polarisations at a point located beyond set of filters 220 location.

In most of the embodiments presented a binary code comparison but, as it will be clear for the skilled person other types of known techniques can be used to detect and locate the failure in the system proposed by the present invention without departing from the scope of the invention.

Summarizing, the present invention describes a method and system for detection and location of failures in deployed optical fibres which solve some of the problems found in prior art techniques and achieve several technical advantages. It provides a mechanism for the identification of deployed optical fibres, labelling each fibre with a code implemented by means of a set of polarization selective suppressed band optical filters, each one tuned at a different central wavelength. This coding scheme which can be mapped into a binary code, different per each fibre, permits the identification of each fibre inside an optical fibre cable or network and allows the automation of optical plant supervision by means of reflectometry, for example, linking fibre colour codes with the aforementioned codes based on suppressed band optical filters.

In other words, the embodiments of the invention disclose a method and a system for optical fibre outside plan supervision based on a unique code per fibre implemented by means of a set of wavelength and polarization sensitive optical passive filters, and a specific tunable and polarization sensitive reflectometry system which interacts with fibre's wavelength and polarization sensitive optical passive filters by means of high-autocorrelation and low cross-correlation pseudo-random binary sequences.

Fibre 6 is coded by means of a set of co-located cascaded optical narrowband suppression filters, each one tuned at a different central wavelength and polarization sensitive. Each fibre of an optical fibre cable will be codified by a set of L filters of this type. In an embodiment, aforementioned optical narrowband polarization sensitive filters are implemented by means of Tilted Fibre Bragg Gratings 210 but other types of filters can be used. These set of filters 220 may be implemented in the fibre 6 during optical fibre cable 1000 manufacturing process avoiding any problem due to polarization planes rotation during optical fibre cable 1000 layout. To take advantage of the proposed solution it is necessary a new type of optical reflectometer, which will be a polarization sensitive tunable reflectometer 300, as it has been described in the previous paragraphs.

The set of filters 220 could also be implemented by means of a pluggable passive device which includes a set of L cascaded Tilted Fibre Bragg Gratings 210 each one tuned to its corresponding wavelength and polarization. In this case, the receiver 311b of the tunable and polarization sensitive reflectometer 300 which monitors simultaneously both polarisation components for each wavelength, as it has been described in the previous paragraphs, can solve ambiguity problems due to polarization planes rotation. In cases of two branches with complementary codes (i.e. for every wavelength "+1" code in one fibre is "−1" in the other fibre, and "−1" in the first fibre is a "+1" in the second one) only if there are two failures (one in each fibre) at exactly the same distance from OLT the ambiguaty problems cannot be solved.

Combining both mechanisms, fibre coding by means of wavelength and polarization sensitive filters, and polarization sensitive tunable reflectometer, it is possible the automation of point to point fibre infrastructure supervision. In order to solve any ambiguity problem, like those related with point to multipoint passive optical networks, polarization sensitive tunable reflectometer 300 needs additional mechanisms like those based in wavelength hopping controlled by a PRBS sequence 400 as it has been described in the previous paragraphs.

Hence, proposed invention improves the performance of reflectometry based systems currently used for point-to-multipoint passive optical access networks. Fibre coding implemented through a set of polarization selective suppressed band optical filters, each one tuned at a different central wavelength, besides a polarization sensitive tunable optical reflectometer which can use wavelength hopping, provides a disambiguation mechanism which permits a univocal location of the point where an impairment is.

Fibre labelling through a code made of optical suppressed band filters simplifies optical transport and access infrastructure operations and support, and provides a disambiguation mechanism for PON access networks. So the proposed solution will reduce the cost of Optical Outside Plant supervision, which is currently very high due to the constraints of current available solutions.

A person of skill in the art would readily recognize that steps of various above-described methods can be performed by programmed computers. Herein, some embodiments are also intended to cover program storage devices, e.g., digital data storage media, which are machine or computer readable and encode machine-executable or computer-executable programs of instructions, wherein said instructions perform some or all of the steps of said above-described methods. The program storage devices may be, e.g., digital memories, magnetic storage media such as a magnetic disks and magnetic tapes, hard drives, or optically readable digital data storage media. The embodiments are also intended to cover computers programmed to perform said steps of the above-described methods.

The description and drawings merely illustrate the principles of the invention.

Although the present invention has been described with reference to specific embodiments, it should be understood by those skilled in the art that the foregoing and various other changes, omissions and additions in the form and detail thereof may be made therein without departing from the scope of the invention as defined by the following claims.

Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

It should be appreciated by those skilled in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

The invention claimed is:

1. Method for supervising a set of optical fibres of an Optical Network, the method being characterized by comprising the steps of:
    a) assigning to each fibre of the set of fibres an unique binary code of L bits, where said binary code is defined by a set of L polarization sensitive optical filters located in each fibre, each filter being tuned at a different wavelength of a set of L wavelengths $\{\lambda_1, \lambda_2 \ldots, \lambda_L\}$ being L a design parameter, and being sensitive to one of two orthogonal polarization components, where each bit of the binary code is defined by the polarization component to which each filter of the set is sensitive, being the binary code assigned to each fibre different from the binary code assigned to the rest of fibres of the set of fibres
    b) injecting a different light signal at an input of said Optical Network for each fibre to be supervised, where said light signal is the result of mapping a binary sequence into polarized light pulses, each polarized light pulse being centred at a certain wavelength of the set of L wavelengths and having a polarization which will depend on the binary code assigned to each fibre to be supervised
    c) for each injected signal, receiving the light signal reflected from the set of fibres by an optical receiver sensitive to wavelength and polarization, and
    d) determining if there has been a failure in the set of fibres and the fibre where the failure is located by analysing the received light signals.

2. The method according to claim 1 wherein the optical network is a Passive Optical Network.

3. The method according to claim 1, where $L >= \lceil \log_2 S \rceil$, being S the number of optical fibres being supervised and where ⌈ ⌉ represents the upper integer limit closer to the S binary logarithm.

4. The method according to claim 1, where each of the filters of the set of filters is a Tilted Fibre Bragg Grating filter.

5. The method according to claim 1 where the binary sequence is a sequence with high autocorrelation and low-cross correlation and the injected polarized light signal is the result of mapping each chip of said binary sequence into a pulse with a wavelength of the set of wavelengths and with the right polarization component according to the set of filters of the fibre which is going to be supervised.

6. The method according to claim 5 where the binary sequence with high autocorrelation and low-cross correlation is a pseudo random binary sequence.

7. The method according to claim 1, where the step of determining if there has been a failure in the set of fibres and the fibre where the failure is located comprises translating the reflected light signal for each injected signal to a binary sequence and comparing said received binary sequence with the binary sequence used in the injected signal.

8. The method according to claim 7 where the translation of the reflected light signal to a binary sequence is made according to the wavelengths and polarizations used in the injected signal for each fibre to be supervised.

9. A system for supervising a set of optical fibres of an Optical Network, the system being characterized by comprising:
    sets of L filters located one set in each optical fibre of the set of fibres, each filter of each set being tuned at a different wavelength of the set of L wavelengths $\{\lambda_1, \lambda_2 \ldots, \lambda_L\}$, being L a design parameter and being sensitive to one of the two orthogonal polarization components and where an unique binary code of L bits is assigned to each fibre, where each bit of the binary code is defined by the polarization component to which each filter of the set is sensitive, being the sequence of pairs formed by the wavelength to which each filter of a set is tuned and the polarization component to which each filter of a set is sensitive in each set of filters different from the sequence in the rest of set of filters of the rest of the fibres so the binary code assigned to each fibre is different from the binary code assigned to the rest of fibres of the set of fibres
    a light emitting source configured for injecting a different polarized light signal for each of the fibres to be supervised at an input of said Optical Network, where said light signal is the result of mapping a binary sequence into polarized light pulses, each polarized light pulse being centred at a certain wavelength of the set of L wavelengths and having a polarization which will depend on the binary code assigned to each fibre
    an optical receiver sensitive to wavelength and polarizations configured to receive the light signal reflected for each injected signal and to determine if there has been a failure in the set of fibres and the fibre where the failure is located by analysing the reflected signal.

10. The system according to claim 9 where the light emitting source and the optical receiver are collocated at the input of said Optical Network.

11. The system according to claim 9 wherein the optical network is a Passive Optical Network.

12. The system according to claim 9, where each of the filters of the set of filters is a Tilted Fibre Bragg Grating filter.

13. The system according to claim 9, where the analysis of the reflected signal to determine if there has been a failure in the set of fibres and the fibre where the failure is located comprises translating the reflected light signal for each fibre to a binary sequence and comparing said received binary sequence with the binary sequence used in the injected signal.

14. A device for supervising a set of optical fibres of an Optical Network where each fibre of the set of fibres has a set of L filters where L is a design parameter, each filter tuned at a different wavelength of the set of L wavelengths and being sensitive to one of the two orthogonal polarization components, and where an unique binary code of L bits is assigned to each fibre, where each bit of the binary code is defined by the polarization component to which each filter of the set is sensitive, being the binary code assigned to each fibre is different from the binary code assigned to the rest of fibres of the set of fibres, the device being caracterized by comprising:

a light emitting source configured for injecting a different polarized light signal for each of the fibres to be supervised at an input of said Optical Network, where said light signal is the result of mapping a binary sequence into polarized light pulses, each polarized light pulse being centred at a certain wavelength of the set of L wavelengths and having a polarization which will depend on the binary code assigned to each fibre an optical receiver sensitive to wavelength and polarizations configured to receive the light signal reflected for each injected signal and to determine if there has been a failure in the set of fibres and the fibre where the failure is located by analysing the reflected signal.

15. A computer program product comprising computer program code adapted to perform the method according to claim 1 when said program code is executed on a computer, a digital signal processor, a field-programmable gate array, an application-specific integrated circuit, a micro-processor, a micro-controller, or any other form of programmable hardware.

* * * * *